(12) United States Patent
Takeuchi et al.

(10) Patent No.: US 11,079,806 B2
(45) Date of Patent: Aug. 3, 2021

(54) DISPLAY DEVICE AND NON-TRANSITORY COMPUTER READABLE MEDIUM STORING DISPLAY CONTROL PROGRAM

(71) Applicant: FUJIFILM Business Innovation Corp., Tokyo (JP)

(72) Inventors: Ko Takeuchi, Kanagawa (JP); Chizuko Sento, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/932,853

(22) Filed: Jul. 20, 2020

(65) Prior Publication Data

US 2021/0208638 A1 Jul. 8, 2021

(30) Foreign Application Priority Data

Jan. 8, 2020 (JP) .............................. JP2020-001618

(51) Int. Cl.
*G09G 5/00* (2006.01)
*G06F 1/16* (2006.01)
*G06F 3/0481* (2013.01)
*G09F 9/30* (2006.01)

(52) U.S. Cl.
CPC .......... *G06F 1/1677* (2013.01); *G06F 1/1652* (2013.01); *G06F 3/04817* (2013.01); *G09F 9/301* (2013.01); *G06F 2200/1637* (2013.01)

(58) Field of Classification Search
CPC ................... G09G 3/3208; G09G 5/14; G09G 2340/0464; G09G 2356/00; G09G 2380/02; G06F 1/2618; G06F 1/162; G06F 1/1652; G06F 1/1654; G06F 1/1977; G06F 3/0481; G06F 3/04817; G06F 3/0482; G06F 3/04845; G06F 3/0487; G06F 3/0488; G06F 3/04886; G06F 3/1423; G06F 3/147; G06F 2200/1637; G09F 9/301
See application file for complete search history.

(56) References Cited

U.S. PATENT DOCUMENTS

| | | | |
|---|---|---|---|
| 10,719,145 B1 * | 7/2020 | Files | G06F 1/169 |
| 2014/0101575 A1 * | 4/2014 | Kwak | G06F 3/0486 715/761 |
| 2015/0074598 A1 * | 3/2015 | Yao | G06F 3/0488 715/803 |
| 2015/0116362 A1 * | 4/2015 | Aurongzeb | G06F 1/1677 345/650 |

(Continued)

FOREIGN PATENT DOCUMENTS

JP 2017211925 11/2017
WO WO-2020180058 A1 * 9/2020

*Primary Examiner* — Joe H Cheng
(74) *Attorney, Agent, or Firm* — JCIPRNET (57) ABSTRACT

A display device capable of taking a tent state in which a display unit is curved in a direction in which a display surface projects, and the display surface is enabled to be visually recognized from both sides, the device includes a processor configured to, in the tent state, cause a top region to function as an instruction input portion configured to receive an instruction from an operator, the top region being located on an upper side of a first side region directed to one side and a second side region directed to the other side in the display surface and straddling the top of the display surface.

11 Claims, 6 Drawing Sheets

(56) References Cited

U.S. PATENT DOCUMENTS

| | | |
|---|---|---|
| 2015/0116364 A1* | 4/2015 | Aurongzeb ............ G06F 1/3265 345/659 |
| 2015/0192960 A1* | 7/2015 | Sharma .................. G06F 1/165 345/2.2 |
| 2017/0345396 A1* | 11/2017 | Yu .......................... G06F 1/1652 |
| 2017/0345397 A1 | 11/2017 | Tsukamoto et al. |
| 2019/0036563 A1* | 1/2019 | Koshy ................. H04W 52/267 |
| 2019/0075240 A1* | 3/2019 | Thai ....................... H04N 5/247 |
| 2019/0163432 A1* | 5/2019 | Files ................. G06K 9/00288 |
| 2019/0278323 A1* | 9/2019 | Aurongzeb ............ G06F 1/1643 |

* cited by examiner

DISPLAY DEVICE AND NON-TRANSITORY COMPUTER READABLE MEDIUM STORING DISPLAY CONTROL PROGRAM

CROSS-REFERENCE TO RELATED APPLICATIONS

This application is based on and claims priority under 35 USC 119 from Japanese Patent Application No. 2020-001618 filed Jan. 8, 2020.

BACKGROUND

(i) Technical Field

The present invention relates to a display device and a non-transitory computer readable medium storing a display control program.

(ii) Related Art

In the related art, a display device that has a flexible display surface and is used in a tent state has been known. The tent state refers to a state in which the display surface is curved to project and is placed to cause the curved portion to be on the upper side. In the tent state, the display surfaces are directed to both sides of the display device, and it is possible to visually recognize the display surfaces from both the sides of the display device.

For example, JP2017-211925A discloses a flexible display including a flexible touch panel. The touch panel in a tent state has a first image display region as a surface facing a speaker and a second image display region as a surface facing a viewer on an opposite side of the speaker. In the touch panel, an image for the speaker is displayed in the first image display region, and an image for the viewer is displayed in the second image display region.

SUMMARY

In a display device capable of taking a tent state, in a case where the display surface is configured in a touch panel, an operator inputs an instruction in the display device by touching the touch panel of the display device in the tent state. Here, it is required to improve the operability on the touch panel of the display device in the tent state.

Aspects of non-limiting embodiments of the present disclosure relate to a display device and a non-transitory computer readable medium storing a display control program that improve operability of an operation of inputting an instruction in the display device in a tent state in comparison to a case where a top region that straddles the top of a display surface is not caused to function as an instruction input portion configured to receive an instruction from an operator.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a display device capable of taking a tent state in which a display unit is curved in a direction in which a display surface projects, and the display surface is enabled to be visually recognized from both sides, the device includes a processor configured to, in the tent state, cause a top region to function as an instruction input portion configured to receive an instruction from an operator, the top region being located on an upper side of a first side region directed to one side and a second side region directed to the other side in the display surface and straddling the top of the display surface.

BRIEF DESCRIPTION OF THE DRAWINGS

Exemplary embodiment(s) of the present invention will be described in detail based on the following figures, wherein.

DETAILED DESCRIPTION

Figure 1:
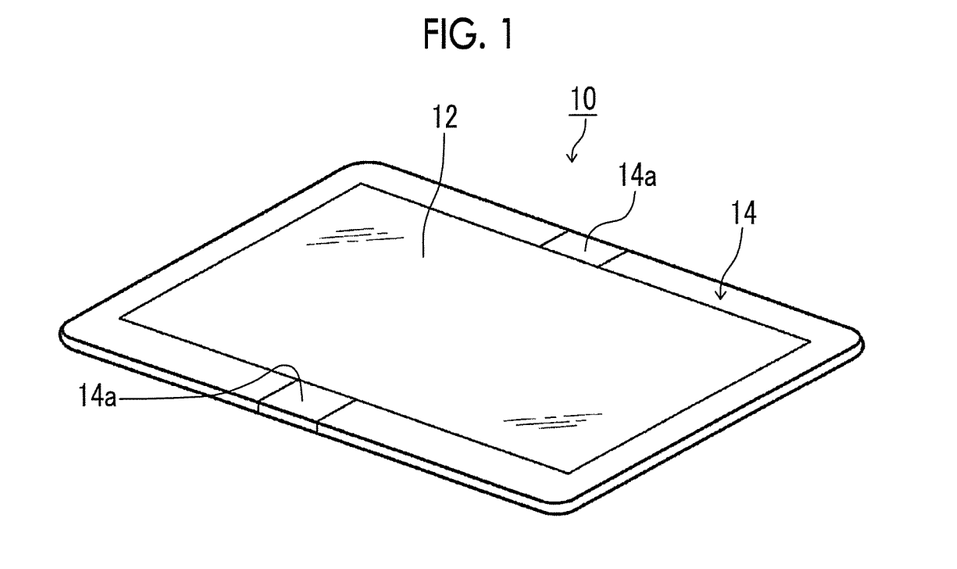
FIG. 1 is a perspective view illustrating a display device in a flat state according to an exemplary embodiment.
Figure 2:
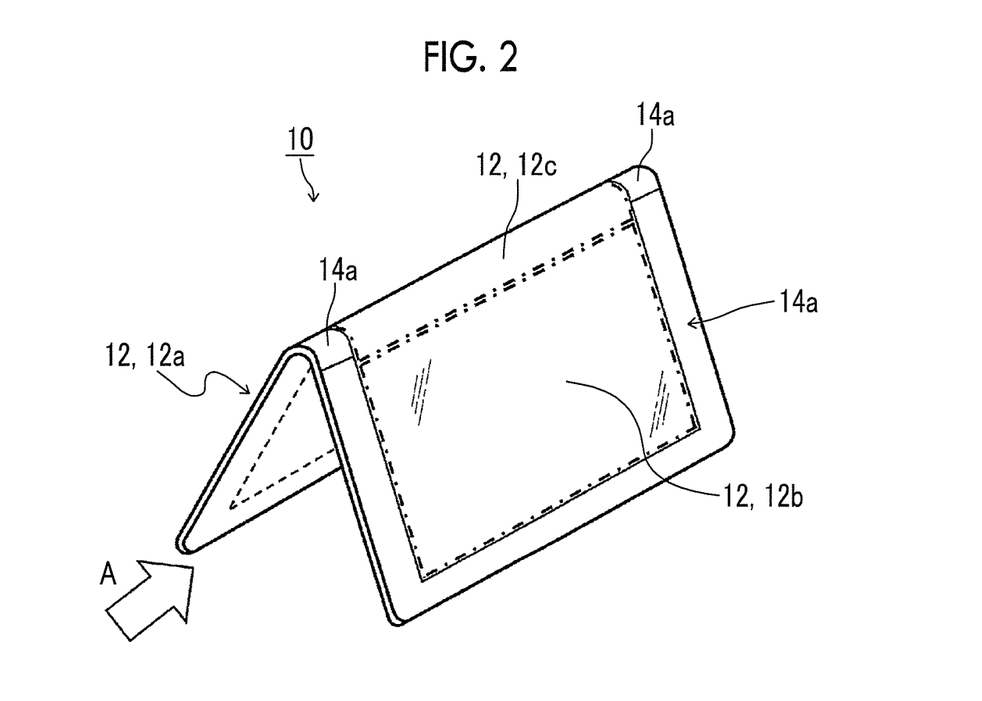
FIG. 2 is a perspective view illustrating the display device in a tent state.

FIGS. 1 and 2 are perspective views illustrating a display device 10 according to an exemplary embodiment. The display device 10 is a computer including a touch panel 12 as a display unit and a frame body 14 formed of resin or the like. In the exemplary embodiment, the display device 10 has a substantially rectangular shape in a plan view, but the shape of the display device 10 is not limited to this shape as long as a tent state described later may be taken.

The touch panel 12 is formed of, for example, organic Electro-Luminescence (EL) and has flexibility. Thus, the display device 10 may take a flat state and a curved state as illustrated in FIG. 2. In the flat state, the touch panel 12 has a flat plate shape as illustrated in FIG. 1. In particular, the display device 10 may take a state where the touch panel 12 is curved in a direction in which a display surface projects, and is placed to cause a curved portion to be placed on an upper side, as illustrated in FIG. 2. In the specification, such a state is referred to as a tent state.

In the exemplary embodiment, the display device 10 may be set in the tent state in a manner that the central portion in a longitudinal direction is curved (in other words, the curved position corresponds to the central portion in the longitudinal direction), but the display device 10 may be set in the tent state in a manner that the central portion in a transverse direction is curved.

Although the frame body 14 is formed of resin or the like as described above, a central portion 14a in the longitudinal direction, which is the curved position, is formed of a flexible member. Thus, the tent state of the display device 10 is realized. The portions of the frame body 14 other than the central portion 14a may not be flexible in order to maintain the strength of the display device 10.

Figure 3:
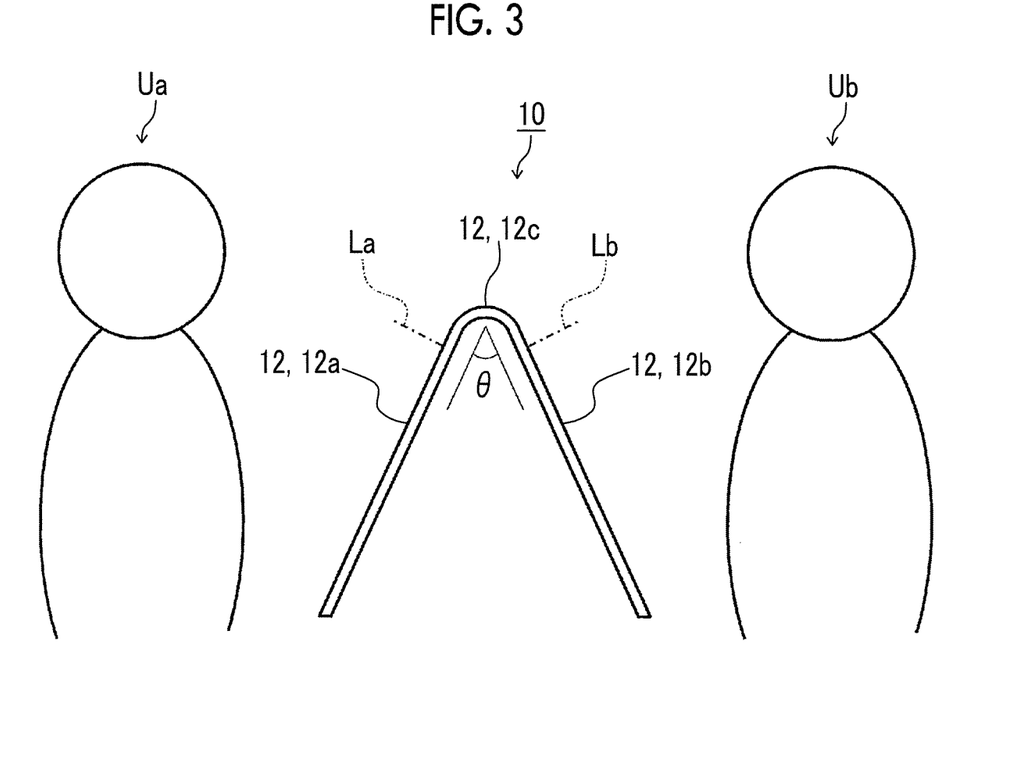
FIG. 3 is a diagram viewed from a direction indicated by an arrow A in FIG. 2.

FIG. 3 is a diagram viewed from a direction indicated by an arrow A in FIG. 2. In the tent state, different portions of the touch panel 12 are directed to both sides of the display device 10. Thus, it is possible to cause an operator (user) to visually recognize the portions of the touch panel 12 from both sides of the display device 10. Specifically, as illustrated in FIG. 3, a user Ua as a first operator on one side of the display device 10 and a user Ub as a second operator on the other side of the display device 10 are allowed to visually recognize the portions of the touch panel 12, respectively. As described above, in this specification, both the sides (that is, one side and the other side) of the display device 10 mean both sides to which respective portions of the touch panel 12 are directed when the display device 10 is in the tent state. FIG. 3 illustrates one user Ua on the one side of the display device 10 and one user Ub on the other side of the display device 10. A plurality of users may be on each of both the sides of the display device 10. In this specification, descriptions will be made on the assumption that, regardless of whether the user is one or more, a user on the one side of the display device 10 is referred to as the user Ua, and a user on the other side of the display device 10 is referred to as the user Ub. In this specification, in a case where distinguishment between the user Ua and the user Ub is not particularly needed, the user Ua and the user Ub are simply described as a user.

In the tent state, because the touch panel 12 is curved, the touch panel 12 has a portion directed to one side (user Ua side), a portion directed to the other side (user Ub side), and a curved portion. The curved portion is located on the upper side of both the portions and has a portion directed upward. The reference signs 12a, 12b, and 12c in FIG. 3 will be described later.

Figure 4:
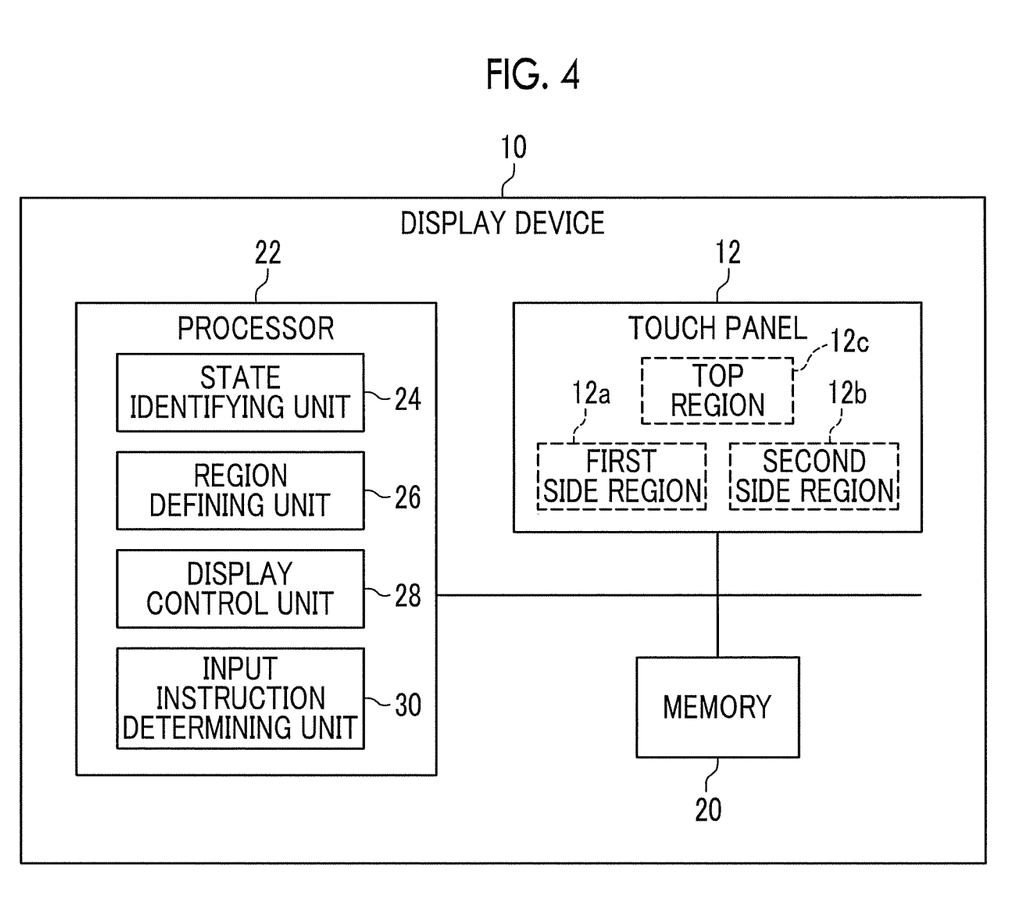
FIG. 4 is a functional block diagram illustrating the display device according to the exemplary embodiment.

FIG. 4 is a functional block diagram illustrating the display device 10 according to the exemplary embodiment. As illustrated in FIG. 4, the display device 10 includes the touch panel 12, a memory 20, and a processor 22.

Because the touch panel 12 is as described above, the description will not be repeated. A first side region 12a, a second side region 12b, and a top region 12c illustrated in FIG. 4 will be described later.

The memory 20 includes, for example, a ROM, a RAM, or an embedded Multi Media Card (eMMC). The memory 20 may be provided separately from the processor 22 described later, or at least a portion of the memory 20 may be provided in the processor 22. A display control program for operating each unit of the display device 104 is stored in the memory 20.

In the embodiments above, the term "processor" 22 refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" 22 is broad enough to encompass one processor or plural processors in collaboration which are located physically apart from each other but may work cooperatively. As illustrated in FIG. 4, the processor 22 exhibits the functions as a state identifying unit 24, a region defining unit 26, a display control unit 28, and an input instruction determining unit 30 in accordance with the display control program stored in the memory 20.

The state identifying unit 24 identifies the state of the display device 10. Specifically, the state identifying unit 24 identifies whether the display device 10 is in the flat state or the tent state. In the exemplary embodiment, the display device 10 includes a sensor (not illustrated) capable of detecting the bending angle θ (see FIG. 3) of the display device 10. In a case where the bending angle θ detected by the sensor is equal to or greater than a predetermined angle, the state identifying unit 24 identifies that the display device 10 is in the flat state. In a case where the bending angle θ detected by the sensor is smaller than the predetermined angle, the state identifying unit 24 identifies that the display device 10 is in the tent state. A method of identifying the state of the display device 10 by the state identifying unit 24 may be a method other than the above description.

In a case where the state identifying unit 24 identifies that the state of the display device 10 is the tent state, the region defining unit 26 conceptually divides the display surface of the touch panel 12 and defines a plurality of regions on the touch panel 12. Specifically, with reference to FIG. 3, on the touch panel 12, the region defining unit 26 defines a first side region 12a, a second side region 12b, and a top region 12c. The first side region is directed to one side of the display device 10 and refers to a region on a lower side than the one-dot chain line La in FIG. 3. The second side region 12b is directed to the other side of the display device 10 and refers to a region on a lower side than the one-dot chain line Lb in FIG. 3. The top region 12c is located on an upper side of the first side region 12a and the second side region 12b, straddles the top of the display surface, and refers to a region from the one-dot chain line La to the one-dot chain line Lb. As illustrated in FIG. 3, the user Ua on the one side of the display device 10 is allowed to visually recognize the entirety of the first side region 12a. The user Ub on the other side of the display device 10 is allowed to visually recognize the entirety of the second side region 12b. Both the users Ua and Ub are allowed to visually recognize a portion of the top region 12c, which is equal to or larger than the half of the top region 12c. It is not possible to visually recognize the first side region 12a from the other side. In a case where the user Ub wants to view the first side region 12a, it is necessary to go around to the one side of the display device 10. That is, it is very difficult for the user Ub to visually recognize the first side region 12a. Similarly, it is very difficult for the user Ua to visually recognize the second side region 12b.

A boundary position between the first side region 12a and the top region 12c and a boundary position between the second side region 12b and the top region 12c, which determine the length of the top region 12c in the longitudinal direction of the touch panel 12, are predetermined by the display control program in the exemplary embodiment. The length of the top region 12c in the longitudinal direction of the touch panel 12 may be settable by the user.

In a case where the display device 10 is in the flat state, the region defining unit 26 does not define the above-described region on the touch panel 12.

The display control unit 28 controls the touch panel 12 to display various screens. For example, the display control unit 28 causes the touch panel 12 to display a background image, windows of various applications for displaying target files (electronic documents, photographs, moving images, and the like), or an operation icon to be operated by the user. In a case where the display device 10 is in the tent state, the display control unit 28 individually displays a screen for each region defined by the region defining unit 26. Thus, the display content in the top region 12c is discontinuous with the display contents in the first side region 12a and the second side region 12b. Here, the sentence that the display contents of the first side region 12a and the second side region 12b are discontinuous means a state where not one screen is displayed over the first side region 12a and the second side region 12b, but individual screens are displayed in the first side region 12a and the second side region 12b, respectively. More specifically, the sentence means that the display control unit 28 separately generates a screen for the first side region 12a and a screen for the second side region 12b, and then displays the generated screens in the first side region 12a and the second side region 12b, respectively.

Figure 5:
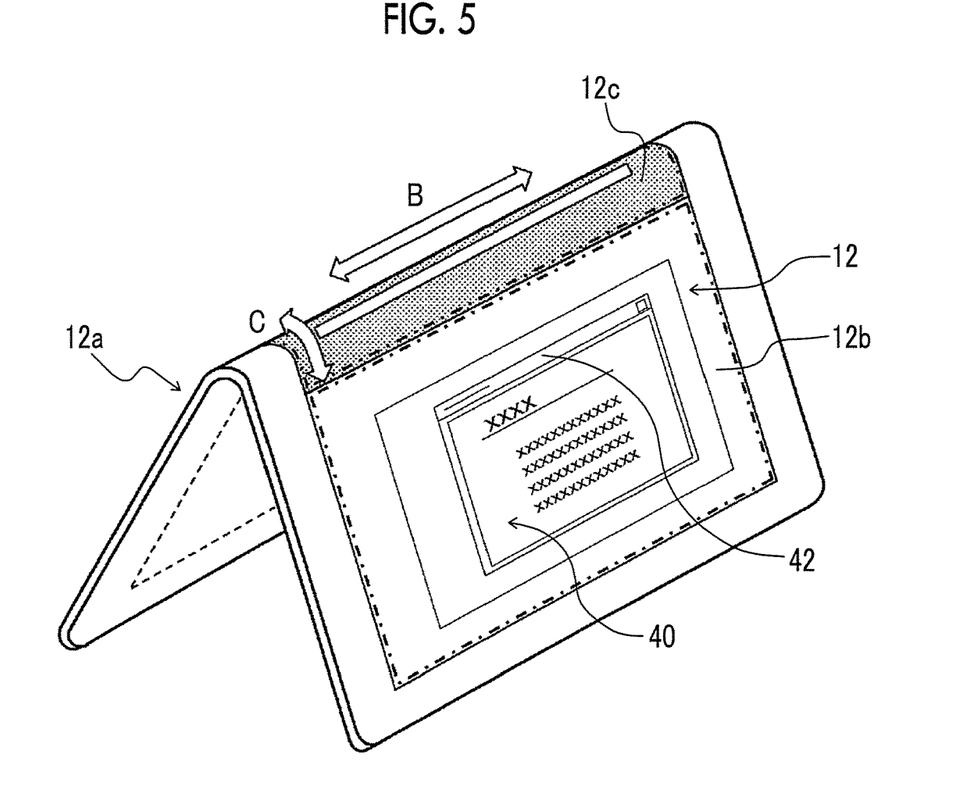
FIG. 5 is a diagram illustrating a state in which a screen is displayed on a touch panel.
Figure 6:
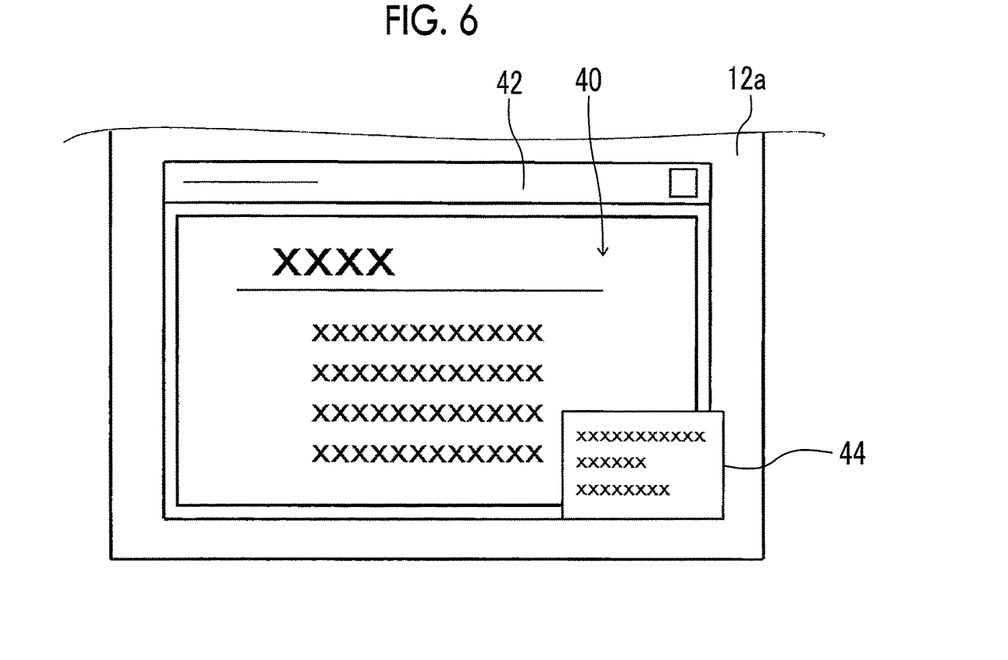
FIG. 6 is a diagram illustrating an example of a screen displayed in a first side region.
Figure 7:
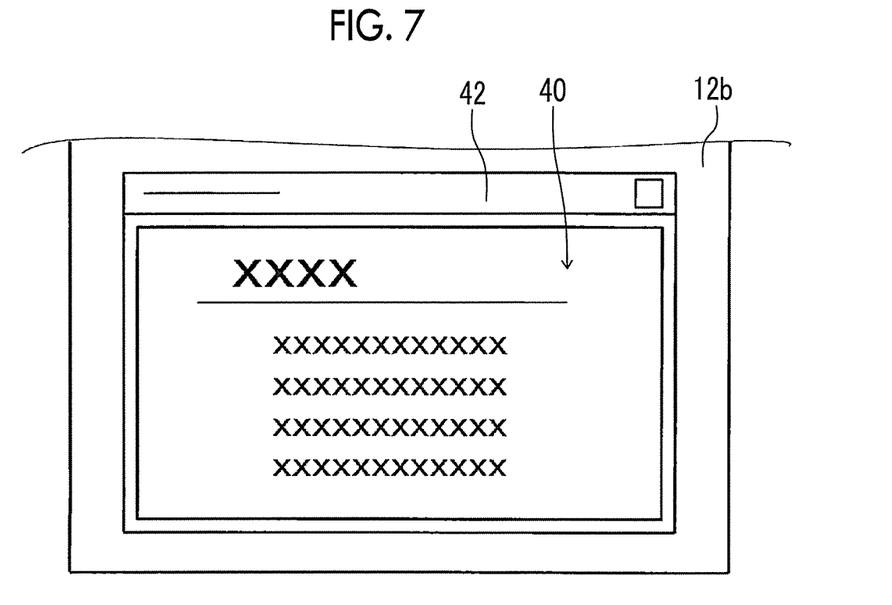
FIG. 7 is a diagram illustrating an example of a screen displayed in a second side region.

FIG. 5 is a diagram illustrating a scene in which, in a case where the display device 10 is in the tent state, a screen is displayed on the touch panel 12. FIG. 6 illustrates an example of a screen displayed in the first side region 12a. FIG. 7 illustrates an example of a screen displayed in the second side region 12b. The examples in FIGS. 5 to 7 refer to examples of screens in a case where the user Ua as a speaker on the first side region 12a side gives a presentation to the user Ub as a viewer on the second side region 12b side.

In the exemplary embodiment, a screen for the user Ua is displayed in the first side region 12a directed toward the user Ua, and a screen for the user Ub is displayed in the second side region 12b directed toward the user Ub. As illustrated in FIG. 6, a document application window 42 and a memo 44 are displayed in the first side region 12a. The document application window 42 includes an electronic document 40 which is a presentation material. In the memo 44, a content and the like to be verbally explained to the viewer is described. As illustrated in FIG. 7, in the second side region 12b, only the document application window 42 including the electronic document 40 which is a presentation material is displayed, and the memo 44 is not displayed. As described above, although different screens are displayed in the first side region 12a and the second side region 12b in the exemplary embodiment, an identical screen may be displayed in the first side region 12a and the second side region 12b.

A screen different from the screens in the first side region 12a and the second side region 12b is displayed in the top region 12c. As illustrated in FIG. 5, the background image (background color in the example of FIG. 5) in the top region 12c is different from the colors in the first side region 12a and the second side region 12b. In the top region 12c, the operation icon (icon, for example, used for performing an operation to control display of the side region 12a or 12b), more specifically, an operation bar for delivering (or returning) a display page of the electronic document 40 in the document application window 42 is displayed. In the exemplary embodiment, the display control unit 28 displays the operation icon in the top region 12c. The display control unit 28 may display only the background image in the top region 12c and may not display the operation icon. Alternatively, the display control unit 28 may not display anything in the top region 12c.

As described later, the top region 12c functions as an instruction input portion configured to receive an instruction from the user. That is, the top region 12c is a region to be operated by the user. Because the display content in the top region 12c is different from the display contents in the first side region 12a and the second side region 12b, it is possible to cause the user to easily understand the range of the top region 12c being a region to be operated by the user.

As described above, the display device 10 is capable of state transition between the flat state (see FIG. 1) and the tent state (see FIG. 2 and the like). Here, for example, the display control unit 28 preferably displays the screens in the first side region 12a, the second side region 12b, and the top region 12c after the state of the device transitions to the tent state, to correspond to a screen displayed on the touch panel 12 in the flat state before the transition to the tent state is performed.

For example, in a case where transition to the tent state from a state where the document application window 42 including a certain page of the electronic document 40 is displayed on the touch panel 12 in the flat state has been performed, the display control unit 28 causes the document application window 42 including the page of the electronic document 40 to be displayed in the first side region 12a and the second side region 12b. At this time, the display size of the document application window 42 may be appropriately changed such that the document application window 42 is displayed in the first side region 12a and the second side region 12b. The display control unit 28 causes the operation icon for the document application window 42 to be displayed in the top region 12c. For example, as described above, the display control unit 28 causes the operation bar or the like for switching a display page of the electronic document 40, which is to be displayed in the document application window 42, to be displayed in the top region 12c. Alternatively, for example, in a case where a moving image is displayed on the touch panel 12 in the flat state, and transition is performed from such a state to the tent state, the display control unit 28 causes the moving image to be displayed in the first side region 12a and the second side region 12b, and causes operation icons (for example, a play button, a stop button, a fast forward button, and a fast rewind button) for the moving image to be displayed in the top region 12c.

The input instruction determining unit 30 determines whether the touch panel 12 has been operated by the user. The input instruction determining unit 30 determines the type (for example, a tap operation, a double tap operation, a long tap operation, a slide operation, a pinch-in operation, and a pinch-out operation) of operation performed by the user on the touch panel 12. The user operates the touch panel 12, and thereby various instructions are input to the display device 10. Thus, the input instruction determining unit 30 determines whether or not an input instruction from the user has been issued and determines the content of the input instruction. The processor 22 executes various processes in accordance with the input instruction from the user, which has been determined by the input instruction determining unit 30.

The input instruction determining unit 30 determines not only the operations of the users on the first side region 12a and the second side region 12b but also the operation on the top region 12c as an input instruction from the user. That is, in the display device 10, in the tent state, not only the first side region 12a and the second side region 12b but also the top region 12c functions as an instruction input portion that receives an instruction from the user. The user Ua exclusively operates on the first side region 12a because it is difficult for the user Ub to visually recognize the first side region 12a. The user Ub exclusively operates on the second side region 12b because it is difficult for the user Ua to visually recognize the second side region 12b. The top region 12c is located at the top of the display device in the tent state and all the users Ua and Ub on both the sides of the display device 10 are allowed to visually recognize the top region 12c, as described above. Thus, the top region 12c refers to a region on which both the users Ua and Ub are capable of operating, in other words, to an operation region shared by the users Ua and Ub.

For example, in a case where the document application window 42 including the electronic document 40 for presentation is displayed in the first side region 12a and the second side region 12b, as illustrated in FIGS. 5 to 7, and the user performs a slide operation on the top region 12c in a direction (described as a "transverse direction" below) indicated by an arrow B, the input instruction determining unit 30 determines the operation, and the processor 22 switches the display page of the electronic document 40 in the document application window 42, which is displayed in the first side region 12a and the second side region 12b, to the next page or the previous page. In a case where the user performs a slide operation on the top region 12c in a direction (described as a "vertical direction" below) indicated by an arrow C, the input instruction determining unit 30 determines the operation, and the processor 22 changes an enlargement display ratio of the electronic document 40 in the document application window 42 displayed in the first side region 12a and the second side region 12b. The operation content for the top region 12c is not limited to the operation content described above, and the instruction content associated with each operation content is not limited to the instruction content described above. For example, the display control unit 28 may display various operation icons in the top region 12c, and the instruction content corresponding to the operation icon operated by the user may be input.

In a case where the display device 10 is in the tent state, the display device 10 is generally placed on a desk. Thus, the users Ua and Ub on both sides of the display device 10 may look down on the display device 10 in many cases. Therefore, in a case where the user operates the touch panel 12 with a finger (or a stylus (simply described as a "finger" below), an operation on the top region 12c located on the upper side of the first side region 12a or the second side region 12b may be performed easier than an operation on the first side region 12a or the second side region 12b in many cases. That is, because the top region 12c functions as the instruction input portion, the operability of the user on the display device 10 in the tent state is improved.

In the tent state, it is assumed that a plurality of operators are on both sides of the display device. Thus, improvement of the operability of the plurality of operators is intended. According to the exemplary embodiment, as described above, the top region 12c refers to a region in which all the users Ua and Ub on both sides of the display device 10 are allowed to visually recognize the display content. Therefore, both the user Ua and the user Ub are capable of easily operating on the top region 12c. As described above, the operability of the user Ua and the user Ub on both sides of the display device 10 on the display device 10 in the tent state is improved.

In a case where the operation icon is displayed in the top region 12c, it is possible to share the operation icon by the users Ua and Ub. In a case where the operation icon is displayed in the first side region 12a and the second side region 12b, the user Ua has difficulty in an operation on the second side region 12b, and the user Ub has difficulty in an operation on the first side region 12a. Thus, the operation icon is to be displayed in each of the first side region 12a and the second side region 12b. As described above, because the operation icon shared by the users Ua and Ub is displayed in the top region 12c, an effect that it is possible to effectively utilize the display regions of the first side region 12a and the second side region 12b is also exhibited.

As described above, the input instruction determining unit 30 determines the operation of the user on the first side region 12a or the second side region 12b as an input instruction. For example, in a case where the user taps a sentence in the electronic document 40, the input instruction determining unit 30 determines the operation, and the processor 22 shifts the mode to an edit mode for editing the sentence. In a case where the user performs a slide operation on the first side region 12a in the transverse direction, the input instruction determining unit 30 determines the operation, and the processor 22 switches the display page of the electronic document 40 in the document application window 42, which is displayed in the first side region 12a, to the next page or the previous page. In a case where the user performs a pinch-in operation or a pinch-out operation on the second side region 12b, the input instruction determining unit 30 determines the operation, and the processor 22 changes the enlargement display ratio of the electronic document 40 in the document application window 42 displayed in the second side region 12b.

The instruction content that may be input in the top region 12c by the user may be different from at least one of the instruction content that may be input in the first side region 12a or the instruction content that may be input in the second side region 12b. For example, in the example of the above-described presentation scene, even in a case where the second side region 12b is operated, the input instruction determining unit 30 may not consider (ignore) the operation as the input instruction such that the user Ub as a viewer erroneously edits the content of the electronic document 40. Even in this case, the input instruction determining unit 30 determines the operation of the user on the first side region 12a and the operation of the user on the top region 12c to be input instructions. Accordingly, it is possible to input an instruction (for example, an instruction to edit the electronic document 40) by the user Ua as a speaker operating on the first side region 12a, and to suppress an occurrence of a situation in which, in a case where the user Ub as a viewer erroneously operates on the second side region 12b, an instruction (for example, an instruction to edit the electronic document 40) which is not intended by the user Ub is input. The user Ub is capable of switching the display page of the electronic document 40 in the document application window 42 and changing the enlargement display ratio, by operating on the top region 12c.

The instruction content that may be input in the first side region 12a may be different from the instruction content that may be input in the top region 12c. For example, the input instruction determining unit 30 may ignore a transverse slide operation input in the first side region 12a and a pinch-in or pinch-out operation without being considered as an instruction to switch the display page of the electronic document 40 in the document application window 42 or an instruction to change the enlargement display ratio of the electronic document 40 in the document application window 42.

In a case where the display device 10 is in the tent state, for example, the input instruction determining unit 30 preferably identifies whether an operator who operates (in other words, inputs an instruction) on the top region 12c is the user Ua on one side of the display device 10 or the user Ub on the other side of the display device 10. In addition, for example, the input instruction determining unit 30 preferably determines the input instruction content in accordance with the identified operator and the operation content.

Figure 8:
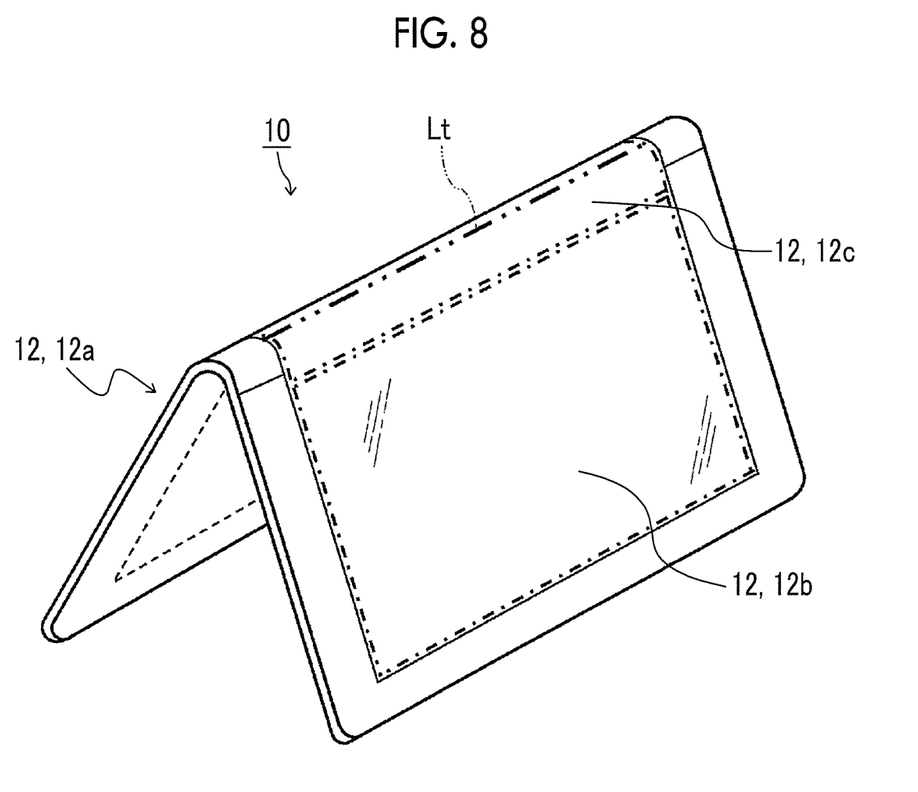
FIG. 8 is a diagram illustrating a center line of a top region.

The operator may be determined by various methods. With reference to FIG. 8, in a case where the user Ua on one side of the display device 10 operates on the top region 12c, the contact region between the finger of the user Ua and the top region 12c is generally closer to the one side of the display device 10, that is, to the first side region 12a than a top line Lt extending the top of the display device 10 in the transverse direction. Similarly, in a case where the user Ub on the other side of the display device 10 operates on the top region 12c, the contact region between the finger of the user Ub and the top region 12c is generally closer to the other side of the display device 10, that is, to the second side region 12b than the top line Lt. Thus, the input instruction determining unit 30 compares the area of a portion on the first side region 12a from the top line Lt with the area of a portion on the second side region 12b from the top line Lt in the contact region between the finger of the user and the top region 12c. In a case where the area of the portion on the first side region 12a from the top line Lt is larger, the input instruction determining unit 30 determines the operation to be performed by the user Ua. In a case where the area of the portion on the second side region 12b from the top line Lt is larger, the input instruction determining unit 30 determines the operation to be performed by the user Ub.

The display device 10 may include a camera that captures an image of one side and a camera that captures an image of the other side in the tent state, and identify the user who operates on the top region 12c based on the captured images of the plurality of cameras.

The above-described user identification method is just an example, and the user who operates on the top region 12c may be identified by other methods.

The input instruction determining unit 30 determines the instruction content in accordance with the user who has been identified in the above-described manner and has performed an operation on the top region 12c, and the operation content. For example, with reference to FIG. 5, a case where the user performs a slide operation in the transverse direction along the operation bar displayed in the top region 12c is considered. As described above, the slide operation is for switching the display page of the electronic document 40 in the document application window 42. Specifically, in a case where the slide operation is performed on the screen from the left to the right, the display page is switched to a page next to the current page. In a case where the slide operation is performed on the screen from the right to the left, the display page is switched to a page next to the previous page.

Thus, in a case where the user performs a slide operation on the top region 12c in the transverse direction from the front side to the rear side in FIG. 5, and the input instruction determining unit 30 identifies that the user who has performed the operation is the user Ua, the user Ua has performed the slide operation on the first side region 12a from the right to the left. Thus, the input instruction determining unit 30 determines that this operation is an instruction to switch the display page of the electronic document 40 in the document application window 42, which is displayed in the first side region 12a, to the previous page. In a case where the input instruction determining unit 30 identifies that the user who has performed the operation is the user Ub, the user Ub has performed the slide operation on the second side region 12b from the left to the right. Thus, the input instruction determining unit 30 determines that this operation is an instruction to switch the display page of the electronic document 40 in the document application window 42, which is displayed in the second side region 12b, to the next page. Then, the processor 22 executes the processes as determined by the input instruction determining unit 30.

Although not limited to this, in the top region 12c, an instruction to influence the display content of at least one of the first side region 12a or the second side region 12b may be received from the user. As described above, an instruction to switch the display page of the electronic document 40 in the document application window 42, which is displayed in the first side region 12a or the second side region 12b, an instruction to change the enlargement display ratio of the electronic document 40 in the document application window 42, and the like are typical examples. Here, for example, the input instruction determining unit 30 preferably determines a region (referred to as a "target region" in this specification) having a display content influenced by an instruction input in the top region 12c, from the first side region 12a and the second side region 12b. For example, the input instruction determining unit 30 may select only the first side region 12a, only the second side region 12b, or both the first side region 12a and the second side region 12b as the target region.

Various methods may be provided as a method of selecting the target region. For example, the display control unit 28 may display an operation icon for selecting the target region on the top region 12c. The user may operate the operation icon to input an instruction of the target region, and the input instruction determining unit 30 may select the target region for an instruction input after that, based on the above instruction. As a specific example, in the presentation scenes illustrated in FIGS. 5 to 7, in a case where the user Ua operates the operation icon to select only the second side region 12b as the target region, and then the user performs a slide operation on the top region 12c in the vertical direction, the input instruction determining unit 30 determines the slide operation to be an instruction to change the display enlargement ratio of the electronic document 40 in the document application window 42 displayed in the second side region 12b. Then, the processor 22 changes the display enlargement ratio of the electronic document 40 displayed in the second side region 12b, in accordance with the operation of the user Ua. At this time, the processor 22 does not change the display enlargement ratio of the electronic document 40 in the document application window 42 displayed in the first side region 12a.

The input instruction determining unit 30 may determine the target region based on the operation content of the user on the top region 12c. In this case, the user does not need to input the instruction of the target region in advance. For example, in the presentation scenes illustrated in FIGS. 5 to 7, it is preferable that, for example, the user Ua as a speaker and the user Ub as a viewer view the identical page of the electronic document 40. Thus, it is preferable that, for example, the identical page of the electronic document 40 is displayed in the first side region 12a and the second side region 12b. Because the user Ua and the user Ub may have the display enlargement ratios which make it easy to see the electronic document 40, it is not necessary that the display enlargement ratio of the electronic document 40 in the document application window 42 is identical in the first side region 12a and the second side region 12b.

Thus, in a case where the user Ua or the user Ub performs a slide operation on the top region 12c in the transverse direction, the input instruction determining unit 30 may determine that the target region for the operation is both the first side region 12a and the second side region 12b, and determine the slide operation to be an instruction to switch the display page of the electronic document 40, which is displayed in the first side region 12a and the second side region 12b. In this case, the processor 22 switches the display page of the electronic document 40 in the document application window 42, which is displayed in the first side region 12a and the second side region 12b.

In a case where the user Ua performs a slide operation on the top region 12c in the vertical direction, the input instruction determining unit 30 may identify that the user who has performed the operation is the user Ua, determine the first side region 12a on the identified user Ua side to be the target region of the slide operation, and determine the slide operation to be an instruction to change the display enlargement ratio of the electronic document 40 in the document application window 42 displayed in the first side region 12a. In this case, the processor 22 changes the display enlargement ratio of the electronic document 40 in the document application window 42 displayed in the first side region 12a. In a case where the user Ub performs a slide operation on the top region 12c in the vertical direction, the input instruction determining unit 30 may identify that the user who has performed the operation is the user Ub, determine the second side region 12b on the identified user Ub side to be the target region of the slide operation, and determine the slide operation to be an instruction to change the display enlargement ratio of the electronic document 40 in the document application window 42 displayed in the second side region 12b. In this case, the processor 22 changes the display enlargement ratio of the electronic document 40 in the document application window 42 displayed in the second side region 12b.

The configuration outline of the display device 10 is as described above. The processing flow of the display device 10 will be described below with reference to the flowchart illustrated in FIG. 9. At the start of the flowchart in FIG. 9, it is assumed that the display device 10 is in the flat state, and the document application window 42 including the electronic document 40 is displayed on the touch panel 12.

Figure 9:
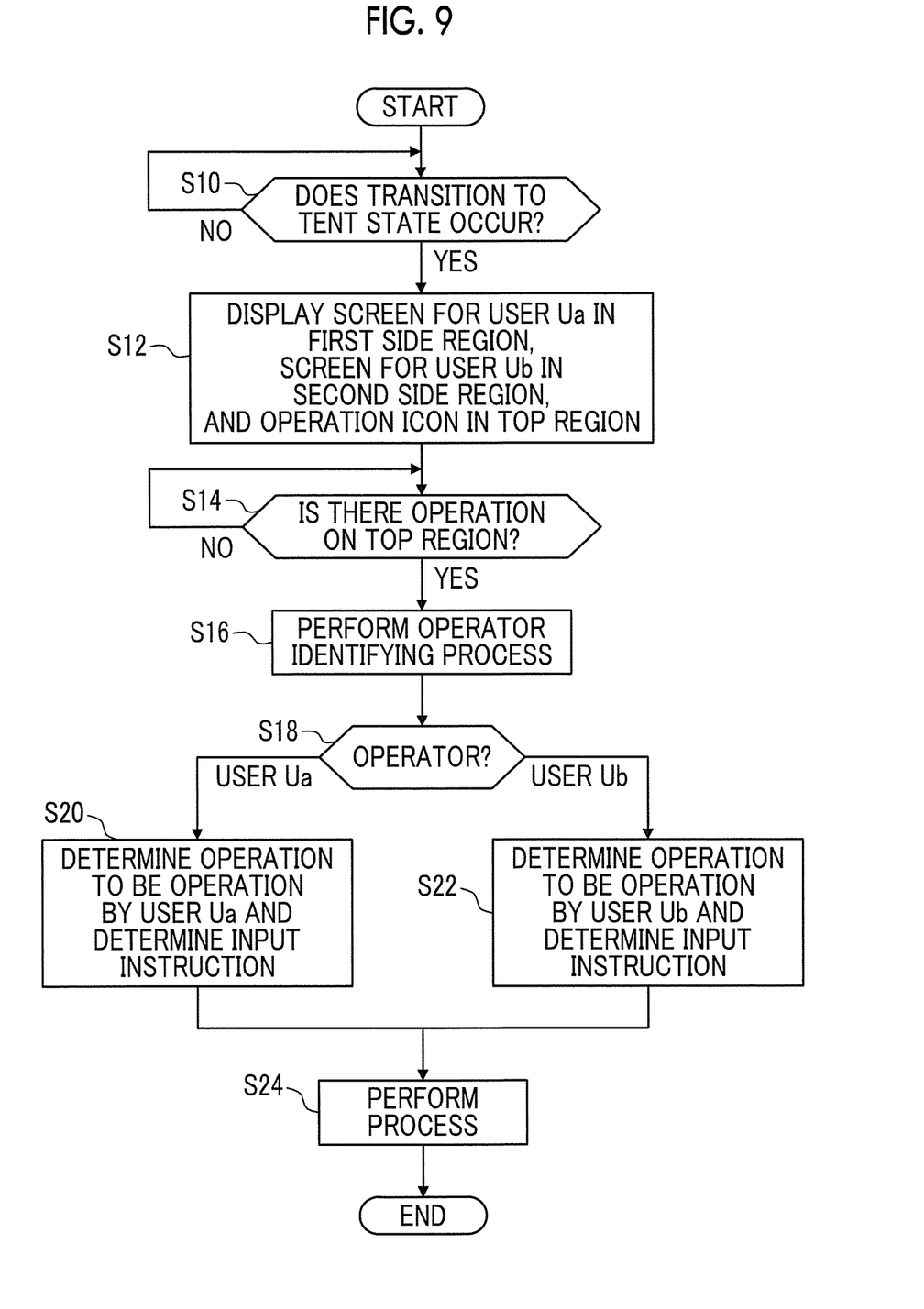
FIG. 9 is a flowchart illustrating a processing flow of the display device according to the exemplary embodiment.

In Step S10, the state identifying unit 24 identifies whether or not the state of the display device 10 has transitioned to the tent state. Ina case where the transition to the tent state does not occur, the processor 22 determines that the display device 10 is in the flat state and continues processing. In a case where it is identified that the transition to the tent state occurs, the process proceeds to Step S12.

In Step S12, the region defining unit 26 defines the first side region 12a, the second side region 12b, and the top region 12c on the curved touch panel 12. The display control unit 28 displays the document application window 42 displayed in the flat state in the first side region 12a and the second side region 12b while changing the display size. The display control unit 28 causes the operation icon for the document application window 42 to be displayed in the top region 12c.

In Step S14, the input instruction determining unit 30 determines whether or not the user has operated on the top region 12c. In a case where there is the operation on the top region 12c, the process proceeds to Step S16. In a case where the user has performed an operation on the first side region 12a or the second side region 12b even in a case where there is no operation on the top region 12c, the processor 22 appropriately executes the processes in response to the operation.

In Step S16, the input instruction determining unit 30 identifies whether the user who has operated on the top region 12c is the user Ua or the user Ub. In a case where it is identified that the user who has operated on the top region 12c is the user Ua, the process proceeds to Step S20. In a case where it is identified that the user is the user Ub, the process proceeds to Step S22.

In Step S20, the input instruction determining unit 30 determines the operation input in the top region 12c in Step S14 to be an operation by the user Ua and determines the input instruction in accordance with the operation content. In Step S22, the input instruction determining unit 30 determines the operation input in the top region 12c in Step S14 to be an operation by the user Ub and determines the input instruction in accordance with the operation content.

In Step S24, the processor 22 executes the processes in response to the input instruction determined in Step S20 or S22.

Hitherto, the exemplary embodiment of the present invention has been described, but the exemplary embodiment of the present invention is not limited to the above exemplary embodiment, and various modifications may be made without departing from the spirit of the present invention.

For example, in the exemplary embodiment, in a case where the display device 10 is in the tent state, the top region 12c has a bowed shape when viewed in the direction indicated by the arrow A in FIG. 2 (see FIG. 3). However, it is not necessary that the top region 12c in the tent state has such a shape, and the top region may have, for example, a flat surface facing upward.

The display device 10 in the tent state may be used for various purposes other than the above-described presentation. For example, the display device 10 in the tent state may be used when the user Ua and the user Ub play a competitive game. In this case, the game screen for the user Ua is displayed in the first side region 12a, and the game screen for the user Ub is displayed in the second side region 12b. In addition, by displaying a calendar in the first side region 12a and the second side region 12b, the display device may be used as an electronic calendar allowed to be visually recognized from both sides. Further, by displaying an electronic photograph in the first side region 12a and the second side region 12b, the display device may be used as a photo frame allowed to be visually recognized from both sides.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display device capable of taking a tent state in which a display unit is curved in a direction in which a display surface projects, and the display surface is enabled to be visually recognized from both sides, the device comprising:
a processor configured to, in the tent state, cause a top region to function as an instruction input portion configured to receive an instruction from an operator, the top region being located on an upper side of a first side region directed to one side and a second side region directed to the other side in the display surface and straddling the top of the display surface.

2. The display device according to claim 1,
wherein a display content of the top region in the tent state is discontinuous with display contents of the first side region and the second side region.

3. The display device according to claim 2,
wherein the processor is configured to display an operation icon for inputting an instruction to the display device, in the top region.

4. The display device according to claim 3,
wherein the display device is capable of state transition between a flat state in which the display unit has a flat plate shape and the tent state, and
the processor is configured to cause the operation icon corresponding to a screen displayed on the display surface in the flat state to be displayed in the top region after the state transitions to the tent state.

5. The display device according to claim 1,
wherein the processor is configured to display an operation icon for inputting an instruction to the display device, in the top region.

6. The display device according to claim 5,
wherein the display device is capable of state transition between a flat state in which the display unit has a flat plate shape and the tent state, and
the processor is configured to cause the operation icon corresponding to a screen displayed on the display surface in the flat state to be displayed in the top region after the state transitions to the tent state.

7. The display device according to claim 1,
wherein an instruction content allowed to be input in the top region is different from at least one of an instruction content allowed to be input in the first side region or an instruction content allowed to be input in the second side region.

8. The display device according to claim 1,
wherein the processor is configured to
identify whether an operator who has input an instruction in the top region in the tent state is a first operator on the one side of the display device or a second operator on the other side of the display device, and
determine an instruction content input in the top region in accordance with the identified operator.

9. The display device according to claim 1,
wherein an instruction influencing a display content of at least one of the first side region or the second side region is received from an operator in the top region, and
the processor is configured to determine a target region in which the display content is influenced by the instruction input in the top region, from the first side region and the second side region.

10. The display device according to claim 9,
wherein the processor is configured to determine the target region in accordance with an operation content of the operator on the top region.

11. A non-transitory computer readable medium storing a display control program causing a computer to function as:
a display device capable of taking a tent state in which a display unit is curved in a direction in which a display surface projects, and the display surface is enabled to be visually recognized from both sides,
wherein, in the tent state, a top region is caused to function as an instruction input portion configured to receive an instruction from an operator, the top region being located on an upper side of a first side region directed to one side and a second side region directed to the other side in the display surface and straddling the top of the display surface.

* * * * *